United States Patent Office 3,049,452
Patented Aug. 14, 1962

3,049,452
RUBBER AND PROPELLANT COMPOSITION CONTAINING THE SAME
Otho D. Ratliff, McGregor, and Wallace T. McMichael, Lake Jackson, Tex., assignors to Phillips Petroleum Company, a corporation of Delaware
No Drawing. Filed Aug. 16, 1957, Ser. No. 678,741
4 Claims. (Cl. 149—19)

This invention relates to an improved rubbery composition. In a further aspect, this invention relates to rocket propellant compositions.

Countless rubbery compositions are available to workers in the art. However, the search continues for new rubbery compositions to meet specific applications. Polymers of 1,3-butadiene and 2-methyl-5-vinylpyridine are well known, such rubbery materials exhibiting good resistance to oils and grease and being widely used in the apparently non-related field of rocket propellants. They are also useful in the production of tires and similar articles subject to abrasion.

While such rubbers can, in many instances, directly replace natural rubber and synthetic rubber of the type exemplified by butadiene/styrene copolymers, certain peculiar difficulties and peculiar properties have exhibited themselves. The present discovery is a direct result of the use of butadiene/vinylpyridine copolymers in the propellant field wherein such a rubbery copolymer is used as a binder for a solid inorganic oxidizing salt to produce propellants best known as the JATO type. In such propellants certain properties are desirable and considerable experimental work has been carried out to obtain the best balance of properties. At the present time, it is believed that such propellants should have certain minimum requirements, these including a minimum elongation of 5 percent and a minimum tensile strength of 125 p.s.i. Furthermore, a low modulus of not more than a few thousand is desirable.

We have discovered that these properties can be obtained using the method of the present invention which is based upon the use of a mixture of two different rubbery polymers and the use of a particular agent which promotes cure of the mixture. More specifically, a mixture of polychloroprene, perhaps better known as neoprene, when mixed with a rubbery polymer of butadiene and a vinylpyridine or vinylquinoline, can be cured to give the desired properties in a propellant when a reaction product of heptaldehyde (enanthaldehyde) and aniline is incorporated therein. This reaction product is a complex product, the material being a dark brown, free-flowing liquid having a specific gravity of 0.93, soluble in acetone, benzene, ethylene dichloride, and gasoline and insoluble in water. While not wishing to be bound by any theory by which the advantages of our invention are obtained, we believe that there is a reaction between the chlorine atoms in the polychloroprene and the nitrogen atoms in the second polymer and that this reaction is catalyzed by the presence of the recited amine reaction product.

The following are objects of our invention.

An object of our invention is to provide new rubbery compositions. A further object of our invention is to provide a method of curing mixtures of polychloroprene and rubbers of the butadiene/vinylpyridine type. A further object of our invention is to provide new rocket propellant compositions and a method of preparing the same. A further object of our invention is to provide a propellant composition incorporating polychloroprene, a rubbery butadiene/vinylpyridine copolymer, a solid inorganic oxidizing salt, and a reaction product of heptaldehyde and aniline.

Other objects and advantages of this invention will become apparent to one skilled in the art upon reading the accompanying disclosure.

Broadly, our invention is based upon the discovery that a cured rubbery composition of good physical properties can be obtained with a comparatively short reaction time when the rubbery composition is a mixture of polychloroprene and a polymer of a conjugated diene and a compound of the pyridine and quinoline series containing a

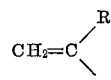

substituent where R is selected from the group consisting of hydrogen and methyl by incorporating therein 0.5 to 10 percent by weight based upon the polymers of a complex reaction product of heptaldehyde and aniline. The resulting mixture can be readily cured at a temperature within the range of 150 to 350° F. The time for cure varies widely but we have obtained very good cures in times as low as 5 minutes. When the rubber is used as a binder for a solid inorganic oxidizing salt in the preparation of propellants, considerably longer times for cure are frequently required and temperatures in the lower portion of the range are frequently used. The time for cure, in some instances, is as long as 100 hours. While this time range is broad, those skilled in the art can easily determine the optimum time for any particular composition.

As those skilled in the art will understand, the conjugated dienes which can be employed are, in addition to butadiene, those which contain from 4 to 6, inclusive, carbon atoms per molecule and include 1,3-butadiene, isoprene (2-methyl-1,3-butadiene), piperylene, 2-methyl-1,3-pentadiene, 2,3-dimethyl-1,3-butadiene, and others. Mixtures of conjugated dienes can be used.

The polymerizable heterocyclic nitrogen bases which are applicable in our invention are those of the pyridine and quinoline series which are copolymerizable with a conjugated diene and contain one and only one

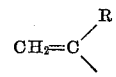

substituent wherein R is either hydrogen or a methyl group. That is, the substituent is either a vinyl or an alpha-methylvinyl (isopropenyl) group. Of these compounds, the pyridine derivatives are of the greatest interest commercially at present. Various substituted derivatives are also applicable but the total number of carbon atoms in the nuclear substituted groups, such as alkyl groups, in addition to the vinyl or alpha-methylvinyl group, should not be greater than 12 because the polymerization rate decreases somewhat with increasing size of the alkyl group. Compounds where the alkyl substituents are methyl and/or ethyl are available commercially.

These heterocyclic nitrogen bases have the formula

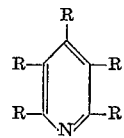

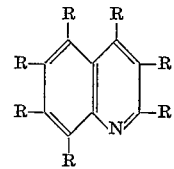

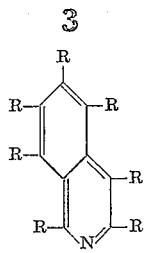

where R is selected from the group consisting of hydrogen, alkyl, vinyl, alpha-methylvinyl, alkoxy, halo, hydroxy, cyano, aryloxy, aryl, and combinations of these groups such as haloalkyl, alkylaryl, hydroxyaryl, and the like; one and only one of said groups being selected from the group consisting of vinyl and alpha-methylvinyl; and the total number of carbon atoms in the nuclear substituted groups in addition to the vinyl or alpha-methylvinyl group, being not greater than 12. Examples of such compounds are 2-vinylpyridine;
2-vinyl-5-ethylpyridine;
2-methyl-5-vinylpyridine;
4-vinylpyridine;
2,3,4-trimethyl-5-vinylpyridine;
3,4,5,6-tetramethyl-2-vinylpyridine;
3-ethyl-5-vinylpyridine;
2,6-diethyl-4-vinylpyridine;
2-isopropyl-4-nonyl-5-vinylpyridine;
2-methyl-5-undecyl-3-vinylpyridine;
2,4-dimethyl-5,6-dipentyl-3-vinylpyridine;
2-decyl-5-(alpha-methylvinyl)pyridine;
2-vinyl-3-methyl-5-ethylpyridine;
2-methoxy-4-chloro-6-vinylpyridine;
3-vinyl-5-ethoxypyridine;
2-vinyl-4,5-dichloropyridine;
2-(alpha-methylvinyl)-4-hydroxy-6-cyanopyridine;
2-vinyl-4-phenoxy-5-methylpyridine;
2-cyano-5-(alpha-methylvinyl)pyridine;
3-vinyl-5-phenylpyridine;
2-(para-methylphenyl)-3-vinyl-4-methylpyridine;
3-vinyl-5-(hydroxyphenyl)pyridine;
2-vinylquinoline;
2-vinyl-4-ethylquinoline;
3-vinyl-6,7-di-n-propylquinoline;
2-methyl-4-nonyl-6-vinylquinoline;
4-(alpha-methylvinyl)-8-dodecylquinoline;
3-vinylisoquinoline;
1,6-dimethyl-3-vinylisoquinoline;
2-vinyl-4-benzylquinoline;
3-vinyl-5-chloroethylquinoline;
3-vinyl-5,6-dichloroisoquinoline;
2-vinyl-6-ethoxy-7-methylquinoline;
3-vinyl-6-hydroxymethylisoquinoline; and the like mixtures can be used.

The copolymers are prepared by polymerizing a major amount of the diene with a minor amount of the heterocyclic nitrogen base by any suitable method. Preferably, the ultimate product has a Mooney viscosity (ML-4) of 10 to 40 although higher Mooney polymers are frequently made and then mixed with extender oils.

The amounts of the neoprene and the nitrogen containing polymer can vary over a very wide range, it only being necessary that the polymer present in minor amount be sufficient to modify the properties of the mixture. However, it is believed that our invention will find its greatest application in mixtures wherein the neoprene amounts to 10 to 60 parts by weight per 100 parts of polymers.

In our invention any of the usual pigments, fillers, reinforcing agents, and antioxidants commonly used in rubbery compositions can be employed in the practice of my invention. The usual solid inorganic oxidizing agents are used, probably the best known thereof being ammonium nitrate and ammonium perchlorate although a great many others are known and the particular oxidant does not constitute a feature of the present invention. Obviously, mixtures of oxidants can be used.

The following examples are given for the purpose of illustrating my invention but they should not be considered as unduly limiting the same.

Example I

A butadiene/2-methyl-5-vinylpyridine copolymer was prepared by emulsion polymerization at 41° F. using a recipe of the following type

| | Parts by weight |
|---|---|
| 1,3-butadiene | 90 |
| 2-methyl-5-vinylpyridine | 10 |
| Water | 200 |
| Potassium fatty acid soap | 6.0 |
| Potassium chloride | 0.1 |
| Sodium salt of formaldehyde/naphthalene sulfonic acid condensation product | 0.3 |
| Tetrasodium salt of ethylene diamine tetraacetic acid | 0.005 |
| Tert-dodecyl mercaptan | 0.5 |
| Ferrous sulfate heptahydrate | 0.2 |
| Potassium pyrophosphate | 0.253 |
| Para-menthane hydroperoxide | 0.1 |

A series of runs was made to an average conversion of 85.9 percent, the products blended, the resulting rubber having a Mooney viscosity (ML-4) of 22.4. As a shortstop, 0.1 part of potassium dimethyldithiocarbamate was used and 1.76 percent by weight, based upon the rubber, of phenol-beta-naphthylamine was added as an antioxidant.

The latex was masterbatched with 22.5 parts by weight of carbon black (Philblack A) per 100 parts of rubber.

Runs were made with this copolymer mixed with polychloroprene (Neoprene WRT), additional carbon black filler, and the complex reaction product of heptaldehyde and analine, the following compositions being produced.

| Ingredient | a | b |
|---|---|---|
| Neoprene WRT | 50.00 | 20.00 |
| Butadiene/2-methyl-5-vinylpyridine copolymer | 50.00 | 80.00 |
| Philblack A | 50.00 | 50.00 |
| Heptaldehyde/aniline reaction product | 5.00 | 5.00 |

The compositions were cured at 320° F., run $a$ giving a Shore A hardness of 64 at the end of 5 minutes and run $b$ giving a Shore A hardness of 52 for the same cure time. After 60 minutes' curing the hardness of these materials was, respectively, 68 and 52.

As a control, a similar formulation without the heptaldehyde/aniline reaction product and with 11.25 parts black was made. This composition required 2½ hours at 320° F. to obtain a Shore A hardness of 40. It is thus readily apparent that the cure rate is greatly accelerated by the addition of the heptaldehyde/aniline reaction product.

Example II

Additional runs were made using the butadiene/2-methyl-5-vinylpyridine copolymer of Example I compounded in accordance with the following recipes.

| Ingredient | b | c |
|---|---|---|
| Butadiene/2-methyl-5-vinylpyridine copolymer | 50 | 50 |
| Neoprene | 50 | 50 |
| Philblack A | 30 | 30 |
| ZP-211 [1] | 10 | 10 |
| Heptaldehyde/aniline reaction product | 2 | 2 |
| Asbestos | 75 | |
| Silica (Hi Sil 202) | | 25 |

[1] Di-(1,4,7-trioxaundecyl) methane.

Following cure at 320° F. for 20 minutes, the Shore A hardness was, respectively, 47 and 56 and, after 120 minutes, the Shore A hardness was, respectively, 65 and 66.

Example III

Propellant compositions were prepared using the butadiene/2-methyl-5-vinylpyridine copolymer of Example I with and without the use of the heptaldehyde/aniline reaction product. The recipes were as follows:

| Ingredient | Run 1 | | Run 2 | |
|---|---|---|---|---|
| | Phr. | Weight Percent | Phr. | Weight Percent |
| Butadiene/2-methyl-5-vinylpyridine copolymer | 75.0 | 8.30 | 75.0 | 8.12 |
| Carbon black | 22.5 | 2.49 | 22.5 | 2.44 |
| Plasticizer | 10.0 | 1.11 | 10.0 | 1.08 |
| Antioxidant | 3.0 | .33 | 3.0 | .32 |
| Neoprene | 25.0 | 2.77 | 25.0 | 2.71 |
| Heptaldehyde/aniline reaction product | | | 3.0 | .32 |
| Binder total | 135.5 | 15.00 | 138.5 | 15.00 |
| Ammonium perchlorate | | 70.00 | | 70.00 |
| Ammonium nitrate | | 15.00 | | 15.00 |
| Propellant total | | 100.00 | | 100.00 |

Portions of each of these propellant compositions were cured at 190° F. for varying lengths of time and elongation, tensile strength, and modulus of elasticity were determined, the following results being obtained.

| | Run 1 | | | Run 2 | | |
|---|---|---|---|---|---|---|
| | Elongation | Tensile strength | Modulus | Elongation | Tensile strength | Modulus |
| Cure at 190° F.: | | | | | | |
| 12 hours | 4 | 90 | 2,100 | 6 | 90 | 5,900 |
| 24 hours | 4 | 100 | 4,000 | 8 | 120 | 2,810 |
| 48 hours | 5 | 120 | 4,700 | 7 | 135 | 3,280 |
| 72 hours | 4 | 120 | 7,000 | 5 | 160 | 7,300 |

Strands were made and tested for auto ignition and the ballistic properties were determined. The results of these tests are set forth in the following table from which it is evident that improved products are obtained when the heptaldehyde/aniline reaction product is included in the recipe.

| | Run 1 | Run 2 |
|---|---|---|
| Auto ignition: | | |
| 5 sec./5 min | 700° F./560° F. | 640° F./460° F. |
| Impact sensitivity | | 28 in./lbs. |
| Density lb./in.³ | 0.0595 | 0.0598. |
| Ballistic properties: | | |
| r at 600 p.s.i | 0.33 | 0.37. |
| r at 1,000 p.s.i | 0.48 | 0.44. |
| n | .59 | .45. |

Example IV

An additional series of runs was made to illustrate the accelerated cure obtainable by using the present invention. Using the rubber of Example I, compounds were made according to the following recipes:

| | Parts by Weight | | |
|---|---|---|---|
| | Run 1 | Run 2 | Run 3 |
| Copolymer | 50 | 50 | 50 |
| Neoprene WRT | 50 | 50 | 50 |
| Carbon black | 50 | 50 | 50 |
| Flexamine [1] | 1 | 1 | 1 |
| Heptaldehyde/aniline reaction product | 0 | 2 | 5 |

[1] Physical mixture containing 65 percent of a complex diarylamine-ketone reaction product and 35 percent of N,N'-diphenyl-para-phenylene diamine.

After curing at 320° F. for 5 minutes, the physical properties were determined, the results being set forth in the following table.

| | Run 1 | Run 2 | Run 3 |
|---|---|---|---|
| Elongation at 100 p.s.i., percent | 115 | 38 | 28 |
| Tensile at 100% elongation, p.s.i | 100 | 270 | 430 |
| Ultimate elongation, percent | 525 | 200 | 175 |
| Ultimate tensile, p.s.i | 420 | 680 | 810 |

The lower elongation and higher tensile are both indicative of a tighter cure. For comparison, run 1 required 60 minutes' cure at 320° F. before the elongation at 100 p.s.i. was 28%.

The polychloroprene used in these examples is neoprene WRT although other types of polychloroprene rubber can be used. In addition to neoprene WRT, these include, for example, neoprene types W, GN, RT, GN, GNA, GRT, KNR and Q.

As many possible embodiments can be made of this invention without departing from the scope thereof, it is to be understood that all matter herein set forth is to be interpreted as illustrative and not as unduly limiting the invention.

We claim:

1. A rocket propellant composition consisting essentially of a rubbery binder, said binder being a mixture of (1) rubbery polychloroprene and (2) rubbery 1,3-butadiene/2-methyl-5-vinylpyridine copolymer, the amount of (1) being 20 to 100 weight percent of (2), and, based upon 100 parts by weight of (1) and (2), 0 to 60 parts of a filler, 0 to 20 parts of a plasticizer, 0 to 3 parts of an antioxidant, 100 to 900 parts of solid inorganic oxidizing salt, and 0.5 to 10 parts of a complex reaction product of heptaldehyde and aniline, said reaction product being a dark brown, free-flowing liquid having a specific gravity of 0.93, soluble in acetone, benzene, ethylene dichloride, and gasoline and insoluble in water.

2. A rocket propellant composition consisting essentially of the following ingredients:

| | Parts by weight |
|---|---|
| Butadiene/2-methyl-5-vinylpyridine copolymer | 8.12 |
| Polychloroprene | 2.71 |
| Carbon black | 2.44 |
| Plasticizer | 1.08 |
| Antioxidant | 0.32 |
| Heptaldehyde-aniline reaction product | 0.32 |
| Ammonium perchlorate | 70.00 |
| Ammonium nitrate | 15.00 | said reaction product being a dark brown, free-flowing liquid having a specific gravity of 0.93, soluble in acetone, benzene, ethylene dichloride, and gasoline and insoluble in water.

3. A rocket propellant composition consisting essentially of a rubbery binder, said rubbery binder being a mixture of (1) rubbery polychloroprene and (2) a rubbery polymer of a conjugated diene of 4 to 6 carbon atoms and a compound of the pyridine and quinoline series containing a

substituent where R is selected from the group consisting of hydrogen and methyl, the amount of (1) being 20 to 100 weight percent of (2) and, based upon 100 parts by weight of (1) and (2), 0 to 60 parts of a filler, 0 to 20 parts of a plasticizer, 0 to 3 parts of an antioxidant, 100 to 900 parts of solid inorganic oxidizing salt, and 0.5 to 10 parts of a complex reaction product of heptaldehyde and aniline, said reaction product being a dark brown, free-flowing liquid having a specific gravity of 0.93, soluble in acetone, benzene, ethylene dichloride, and gasoline and insoluble in water.

4. A rocket propellant composition consisting essentially of a rubbery binder, said binder being a mixture of (1) rubbery polychloroprene and (2) rubbery 1,3-butadiene/2-vinylpyridine copolymer, the amount of (1) being 20 to 100 weight percent of (2), and, based upon 100 parts by weight of (1) and (2), 0 to 60 parts of a filler, 0 to 20 parts of a plasticizer, 0 to 3 parts of an antioxidant, 100 to 900 parts of solid inorganic oxidizing salt, and 0.5 to 10 parts of the complex reaction product of heptaldehyde and aniline, said reaction product being a dark brown, free-flowing liquid having a specific gravity of 0.93, soluble in acetone, benzene, ethylene dichloride, and gasoline and insoluble in water.

References Cited in the file of this patent

UNITED STATES PATENTS

| | | |
|---|---|---|
| 2,323,591 | Gans | July 6, 1943 |
| 2,575,851 | Taylor | Nov. 20, 1951 |
| 2,643,184 | Cairns | June 23, 1953 |
| 2,744,816 | Hutchison | May 8, 1956 |